April 16, 1963 E. J. CHU 3,085,290
METHOD AND APPARATUS FOR PRODUCING LARGE DIAMETER THIN
WALL TUBING OF POLYTETRAFLUOROETHYLENE
Filed Dec. 9, 1959

INVENTOR
EDWARD J. CHU

BY
Byerly, Townsend, Watson & Churchill
ATTORNEYS.

United States Patent Office 3,085,290
Patented Apr. 16, 1963

3,085,290
METHOD AND APPARATUS FOR PRODUCING LARGE DIAMETER THIN WALL TUBING OF POLYTETRAFLUOROETHYLENE
Edward J. Chu, Belleville, N.J., assignor to Resistoflex Corporation, Roseland, N.J., a corporation of New York
Filed Dec. 9, 1959, Ser. No. 858,530
9 Claims. (Cl. 18—14)

The present invention relates to a process and apparatus for producing discrete lengths of large diameter thin wall tubing composed of polytetrafluoroethylene (hereinafter abbreviated P.T.F.E.). More specifically, the invention relates to the sintering of such tubing.

Although the invention is not limited thereto, it is specially adapted for processing paste-extruded tubing. In paste-extrusion fine P.T.F.E. powder is mixed with a volatile liquid, compacted into preforms, and extruded through a die orifice to form the desired shape. The extruded article is quite soft and must be handled with extreme care until it has been baked to evaporate the volatile components and sintered, which converts the paste into a very tough material.

One method presently employed for handling lengths of extruded tubing while in the unsintered fragile state is to insert the tubing or extrude it directly into a pipe of much larger diameter which supports the tubing while it is being handled and sintered. This procedure is quite adequate for tubing within a certain range of diameters and wall thicknesses. However, as the diameter of the extruded tubing is increased, for certain ranges of wall thickness, the tubing is no longer self-supporting and tends to flatten and split during the sintering period. For any size tubing the wall thickness obviously can be made sufficiently thick to render the tubing self supporting. The present invention, however, is concerned with that tubing which has a lesser wall thickness than that required for self-support.

It is not possible to prescribe precisely when a given tube will or will not be self-supporting. However, based upon experience it has been found that tubing having an outside diameter ranging from 2.250 to 2.290 inches generally must have a minimum wall thickness of approximately .060 inch in order to be self-supporting. A minimum wall thickness of approximately .075 inch is required to render self-supporting tubing having an outside diameter of from 3.180 to 3.285 inches. Similarly, tubing having an outside diameter ranging from 4.200 to 4.390 inches requires a minimum wall thickness of approximately .085 inch. These figures are only approximate but are offered as a convenient guide.

The object of the present invention is to provide a process and apparatus for handling those size tubes which would not be self-supporting while obviating the defects referred to previously. In accordance with one aspect of the invention there is provided a process of producing discrete lengths of large diameter thin wall P.T.F.E. tubing which comprises the steps of inserting a given length of P.T.F.E. tubing into the space between a pair of telescoped cylindrical structures or pipes, one larger and the other smaller in diameter than the tubing, and thereafter sintering the tubing while supported horizontally by said structures.

In accordance with a further aspect of the invention there is provided apparatus for use in producing discrete lengths of large diameter thin wall P.T.F.E. tubing by extrusion which comprises a pair of telescoped pipes of different diameter separated by spacing means at one of their ends and secured together with the inner pipe being slightly longer and extending beyond the outer pipe at the other of their ends, means for vertically supporting the pipes below a vertical extruder with the spacing means at the bottom and the upper ends of the pipes positioned for receiving extruded material therebetween, and additional spacing means for insertion between the pipes at the upper ends when the pipes are separated from the extruder.

It is believed that the invention will be better understood after reading the following detailed description thereof with reference to the appended drawings in which.

Figure 1:
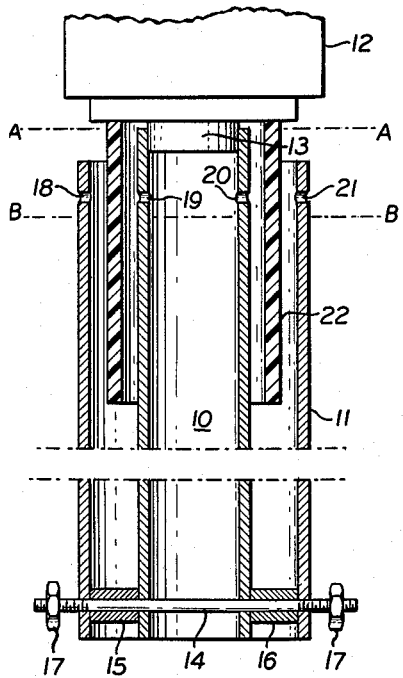
FIG. 1 is a longitudinal sectional view through a somewhat diagrammatic representation of apparatus embodying the present invention.
Figure 2:
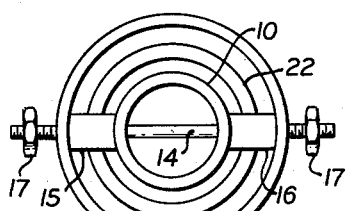
FIG. 2 is a bottom view of the apparatus illustrated in FIG. 1.

Referring now to FIGS. 1 and 2, a pair of telescoped cylindrical structures or pipes 10 and 11 are supported vertically below a vertical extruder 12 by any suitable means (not shown). The inner structure 10 is piloted over an extension 13 secured to the male member of the forming die. The inner structure 10 is slightly longer than the structure 11 and extends beyond the outer structure at the upper end. At the lower end of the pipes or structures a tie rod or bolt 14 is passed through apertures in the walls thereof and through the spacing collars 15 and 16 of equal length. The nuts 17 or similar means are threaded or otherwise secured to the ends of the rod 14 in order to preclude premature removal from the pipes. In-register apertures 18, 19, 20 and 21 are provided in the pipes 10 and 11 at the upper end thereof, as shown, for a reason which will be described hereinafter. The extruded tubing is represented by the reference numeral 22. The equal length collars 15 and 16 function to coaxially position the two structures 10 and 11.

Figure 3:
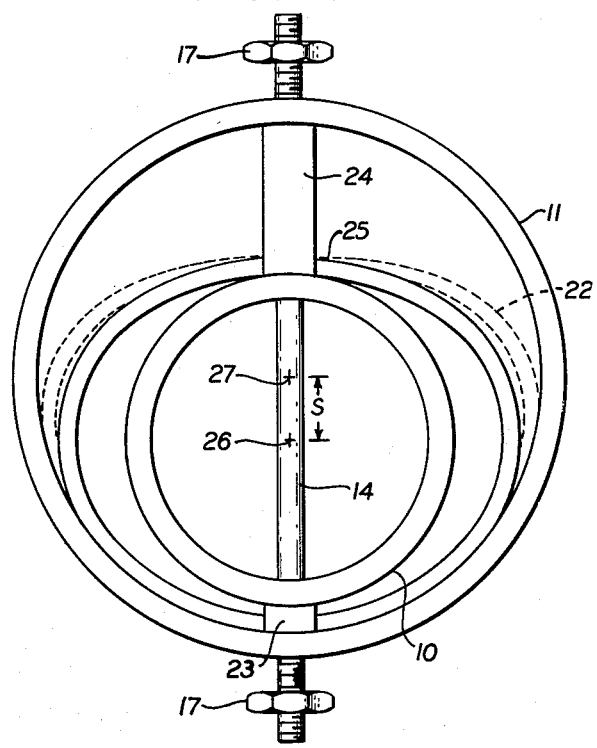
FIG. 3 is a view similar to FIG. 2, but rotated 90°, showing the pair of pipes illustrated in FIG. 1 after they have been removed from the extruder and placed in a horizontal position as well as being relocated relative to each other, all in accordance with the invention.

In practicing the process in accordance with the present invention the telescoped cylindrical structures of different diameters are supported below the vertical extruder and the tubing is extruded into the space therebetween. The extrusion is halted when the tube substantially equals the length of the structures, that is, approaches the collars 15 and 16. The extruded tubing 22 is then clamped to the inner pipe 10 just below the line marked AA on FIG. 1. A strap clamp or the like may be used for this purpose. After clamping the tubing it is severed from the extruder along the line AA. Next the two pipes with the tubing 22 inside are removed from the extruder and laid in a horizontal position. The clamp which had been applied about the exposed end of the tubing is now removed and, with the aid of a hook knife, the tubing is cut back within the pipes to the line BB in FIG. 1 in order to expose the apertures 18, 19, 20 and 21. Next the tie rod 14 is removed along with the spacers 15 and 16 and in their stead are substituted the unequal spacing means or collars 23 and 24 as shown in FIG. 3. The rod 14 is then reinserted. Similar collars or spacing members (not shown) are positioned between the pipes at the opposite end and secured by a second tie rod (not shown) which passes through the apertures 18, 19, 20 and 21 in the pipes and through the collars. It should be noted that the pipes are rotated 90° from the position shown in FIG. 2 to the position shown in FIG. 3 in order that the inner pipe be lowermost. The dotted lines in FIG. 3 show the unsintered tube 22 in the approximate position it assumes resting on what is now the bottom of the outer pipe 11 and the top of the inner pipe 10. Care should be exercised in relocating the pipes from their position below the extruder to the horizontal offset position shown in FIG. 3 in order that the fragile unsintered tubing 22 not be damaged or otherwise marred.

With the apparatus as shown in FIG. 3, the tubing is now ready to be placed in an oven and sintered. It has been found that during the process of sintering and subsequently cooling, the tubing will shrink in diameter and, if unsupported, would tend to flatten or collapse. However, the inner structure 10 continues to support the upper surface of the tubing 22. By proper choice of the size of the structure 10 and its location relative to the outer structure 11 the lower surface of the tubing will remain in contact with and supported by the latter. After completion of sintering and cooling it will be found that the tubing will have assumed approximately the shape shown by the solid lines 25 in FIG. 3. It is assumed that the slightly out-of-round shape of the tube can be tolerated or that the cross-section of the tubing will be reshaped by known post-forming methods not forming a part of the present invention.

Some clearance is required between the outer pipe structure 11 and the unsintered P.T.F.E. tube 22 as the latter is extruded in order to ensure that the tubing can be inserted without causing damage thereto. This prescribes the minimum size outer pipe that can be employed with a given extruded tube diameter. It has been found from experience that for best results the outside pipe 11 should have an inside diameter, $D_{11}$, as defined by the following equation:

$$D_{11} = 1.2x \quad (1)$$

where $x$ equals the average outside diameter of the sintered tubing. Note that it is the sintered and not the unsintered tubing that is used as a reference.

By the same token it has been found that the outside diameter, $D_{10}$, of the inner pipe 10 should have a value approximating that given by the following equation:

$$D_{10} = \frac{y}{1.2} \quad (2)$$

where $y$ is equal to the average inside diameter of the sintered tubing 22.

Finally, as seen in FIG. 3, the displacement, $S$, of the center 26 of the pipe 10 relative to the center 27 of the pipe 11 should be approximately as defined by the following equation:

$$S = \frac{y}{2.4} - \frac{x}{4.2} \quad (3)$$

where $y$ and $x$ are as previously defined.

It is to be understood that the dimensions defined by the foregoing equations are not critical; however, they do indicate what experience has shown to yield satisfactory results. For example, by off-setting the inner pipe relative to the outer pipe it is possible to use a larger diameter inner pipe. This has been found to yield consistently better results than the use of a smaller inner pipe located concentrically with the outer pipe during the sintering step.

As an indication of some of the problems encountered, it has been found that if the distance $S$ as shown in FIG. 3 is too small the sintered tubing will develop wrinkles along the bottom. It has been theorized that this is caused by the fact that upon shrinkage in diameter of the tubing the bottom is lifted from the outside pipe 11 so as to be unsupported. Conversely, it has been discovered that lowering the inner pipe by making the dimension $S$ too large will result in wrinkles being produced on the upper surface of the extruded tubing.

Although the use of eccentric pipe structures is presently preferred, it is believed possible that with judicious selection of the diameters of the inner and outer pipe structures relative to the size of the extruded tubing satisfactory results can be obtained with the two pipes located coaxially during the sintering step. However, present experience with the concentric arrangement has failed to yield consistently satisfactory results.

Figure 4:
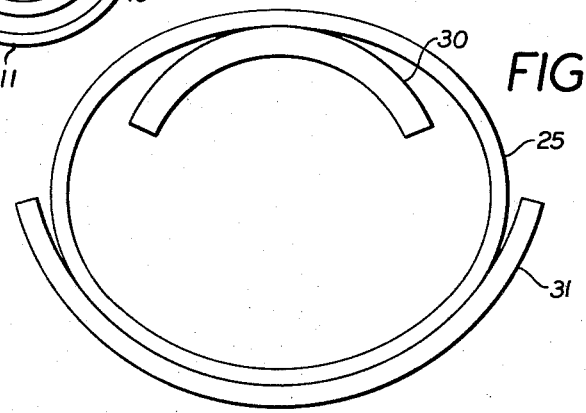
FIG. 4 illustrates diagrammatically a modification of the apparatus of FIG. 1.

Although the use of whole cylindrical structures is preferred, it is possible to use segments as shown diagrammatically in FIG. 4. The radii of the two supporting structures 30 and 31 and the relative displacement of their centers 32 and 33 can be selected by the use of equations 1, 2 and 3. The difficulty foreseen with this type of arrangement is that when the resin tube is extruded there is a danger of it binding or scoring on the sections 30 and 31. However, if additional guidance can be furnished there is no reason why this arrangement cannot operate just as satisfactorily as the complete cylindrical arrangement of FIG. 3. Furthermore, where the tubing is inserted between the structures after severance from the extruder, the arrangement of FIG. 4 may be preferred.

Having described the best method and preferred apparatus known for practicing the subject invention, it should be understood that various changes can be made in the details thereof without departing from the true spirit of the invention as defined in the appended claims.

What I claim is:

1. The process of producing discrete lengths of large diameter thin wall P.T.F.E. tubing comprising the steps of vertically extruding through a die a tube of unsintered P.T.F.E. into the space between two telescoped cylindrical structures of different diameter, the diameters of the two structures being selected relative to the inner and outer diameters of the extruded tube so that the tube enters said space with substantial clearance while said structures cooperate to support the tube against collapse without confining the same when the tube is sintered, halting the extrusion when the tube substantially equals the length of the structures, severing the tube from the extruder, clamping the inner structure in fixed position relative to the outer structure, placing the assembly in a horizontal position in an oven and sintering the tube, thereafter slowly cooling the tube and removing it from the structures.

2. The process of producing discrete lengths of large diameter thin wall P.T.F.E. tubing comprising the steps of vertically extruding through a die a given length of unsintered P.T.F.E. tubing into the space between a pair of telescoped cylindrical rigid structures, one structure being larger and the other structure being smaller in diameter than the tubing such that the tubing enters said space with substantial clearance, placing the assembly in a horizontal position with the smaller structure suspended within the larger structure so as to bear upwardly against the interior of the tubing while the lower portion of the tubing rests upon the larger structure, and thereafter sintering the tubing while so supported horizontally free from confinement by said structures.

3. The process of producing discrete lengths of large diameter thin wall P.T.F.E. tubing which comprises the steps of inserting a given length of unsintered P.T.F.E. tubing into the space between a pair of telescoped cylindrical rigid structures, one structure being larger and the other structure being smaller in diameter than the tubing such that the tubing enters said space with substantial clearance, and thereafter sintering the tubing in a horizontal position with the smaller structure suspended within the larger structure so as to bear upwardly against the interior of the tubing while the lower portion of the tubing rests upon the larger structure.

4. The process of producing discrete lengths of large diameter thin wall P.T.F.E. tubing which comprises the steps of disposing a given length of unsintered P.T.F.E. tubing upon a pair of parallel spaced elongated supporting structures with one of said pair being located within and the other without said tubing, the spacing between said pair as well as the respective size being selected such that the one within the tubing will engage only the upper section thereof giving support thereto and the one without the tubing will engage only the lower section thereof giving support thereto when all are in a horizontal position throughout a sintering period, and sintering said tubing while supported by said pair of structures in a horizontal position.

5. Apparatus for use in producing discrete lengths of large diameter thin wall P.T.F.E. tubing by extrusion, comprising a pair of telescoped pipes of different diameter separated by spacing means at one of their ends and secured together with the inner pipe being slightly longer and extending beyond the outer pipe at the other of their ends, means for vertically supporting the pipes below a vertical extruder with said spacing means at the bottom and the upper ends of the pipes positioned for receiving extruded material therebetween, and additional spacing means for insertion between the pipes at said upper ends without interfering with the extruded material therebetween when the pipes are separated from the extruder.

6. The process of producing discrete lengths of large diameter thin wall P.T.F.E. tubing which comprises the steps of suspending vertically below a vertical extruder a pair of telescoped pipes of different diameter separated by spacing means at their lower ends and secured together with the inner pipe being slightly longer and extending beyond the outer pipe at its upper end adjacent the mouth of the extruder, extruding through a die a tube of unsintered P.T.F.E. with substantial clearance into the space between said pipes, halting the extrusion when the tube substantially equals the length of the pipes and approaches said spacing means, securing the tube to the upper end of the inner pipe, severing the tube from the extruder between the latter and the point where the tube is secured to the inner pipe, disposing the assembly in a horizontal position, releasing the tube from the inner pipe and inserting additional spacing means between the pair of pipes at the upper ends thereof, placing the assembly in a horizontal position in an oven, sintering the tube, and thereafter cooling the tube and removing it from between the pipes.

7. The process of producing discrete lengths of large diameter thin wall P.T.F.E. tubing which comprises the steps of supporting a given length of unsintered P.T.F.E. tubing in the space therebetween on a pair of horizontal telescoped cylindrical rigid structures of different diameters which are maintained with a vertical displacement between the longitudinal axes thereof where the inside diameter of one of said structures and the outside diameter of the other of said structures are approximately equal, respectively, to $1.2x$ and $$\frac{y}{1.2},$$

while the displacement between said axes is maintained approximately equal to $$\frac{y}{2.4} - \frac{x}{4.2}$$

where $x$ equals the average outside diameter and $y$ equals the average inside diameter of the tubing after sintering, and thereafter sintering the tubing while so supported horizontally by both said structures with the axis of the innermost structure vertically below the axis of the outer structure, and both structures bearing upwardly on the tubing.

8. Apparatus for use in producing discrete lengths of large diameter thin wall P.T.F.E. tubing by extrusion, comprising a pair of telescoped pipes of different diameter, means for securing the pipes together coaxially, the inner pipe being slightly longer and extending beyond the outer pipe at one end, means for vertically supporting the pipes below a vertical extruder with said one end uppermost and positioned for receiving extruded material between the pipes, and spacing means for positioning the inner pipe with its longitudinal axis displaced from the axis of the outer pipe when the pipes are separated from the extruder.

9. The process of producing discrete lengths of large diameter thin wall P.T.F.E. tubing which comprises the steps of suspending vertically below a vertical extruder a pair of telescoped pipes of different diameter positioned coaxially by spacing means at the lower ends thereof and secured together with the inner pipe being slightly longer and extending beyond the outer pipe at its upper end adjacent the mouth of the extruder, extruding through a die, a tube of unsintered P.T.F.E. into the space between said pipes, halting the extrusion when the tube substantially equals the length of the pipes and approaches said spacing means, securing the tube to the upper end of the inner pipe, severing the tube from the extruder between the latter and the point where the tube is secured to the inner pipe, placing the assembly in a horizontal position, releasing the tube from the inner pipe, substituting different spacing means at the lower end and inserting additional spacing means at the upper end for positioning the inner pipe with its axis displaced from that of the outer pipe such that the tube is supported by both pipes when disposed horizontally, placing the assembly in a horizontal position in an oven with the inner pipe at its lowest position taking into consideration the relative displacement of the pipes, sintering the tube, and thereafter cooling the tube and removing it from between the pipes.

References Cited in the file of this patent
UNITED STATES PATENTS

| | | |
|---|---|---|
| 1,595,811 | Anderson | Aug. 10, 1926 |
| 2,456,621 | Cheney | Dec. 21, 1948 |
| 2,631,351 | Hoopes | Mar. 17, 1953 |
| 2,810,934 | Bailey | Oct. 29, 1957 |
| 2,889,581 | Vanderhoof | June 9, 1959 |
| 2,938,235 | Press | May 31, 1960 |
| 2,949,371 | Freund et al. | Aug. 16, 1960 |